Patented Sept. 28, 1954

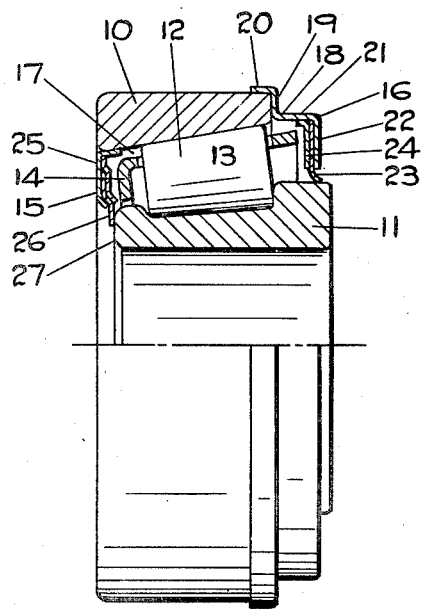

2,690,362

UNITED STATES PATENT OFFICE 2,690,362

SEALED ROLLER BEARING

Arnie J. Kindig, Columbus, Ohio, assignor to The Jeffrey Manufacturing Company, a corporation of Ohio Original application April 3, 1952, Serial No. 280,277. Divided and this application May 11, 1953, Serial No. 354,041

3 Claims. (Cl. 308—187.2)

This invention relates to roller bearings, and one of its objects is to provide improvements in the construction thereof, whereby the bearing parts are sealed together and retained as an assembly or unit.

Another object of the invention is to provide an improved roller bearing assembly wherein bearing parts are retained together as a unit and in which there is lubricant seal means for preventing the loss of lubricant from the inside of the assembly and the entry of foreign matter thereinto.

A further object of the invention is to provide an improved roller bearing assembly in which there is a seal means which also functions to retain parts of the bearing together as an assembly.

Other objects of the invention will appear hereinafter, the novel features and combinations being set forth in the appended claims.

The accompanying drawing shows a roller bearing assembly including the invention.

This application is a division of my application, Serial No. 280,277, filed April 3, 1952, for a Grease Seal.

In the accompanying drawing there is shown an assembled sealed roller bearing which may be considered as a greased or sealed-for-life or "package unit" bearing assembly. Said unit includes an outer cup or race 10 and inner cone or race 11 and an interposed anti-friction roller bearing 12 made up of a plurality of rolls 13 and a retainer or cage 14 which spaces the rolls 13 from each other and is generally in the shape of a frustrum of a cone. This much of the illustrated bearing is one form of standard construction for bearings of this type. The assembly includes lubricant sealing devices 15 and 16 on opposite sides of the rolls 13 for preventing the loss of lubricant from and the entry of foreign matter into a chamber 17 in which the roller bearing 12 is housed and which is formed by the outer cup 10, inner cone 11 and lubricant seals 15 and 16.

Lubricant seal 16 includes a metal stamping 18 that forms an outer shell in which the other parts of the seal 16 are held. This outer shell 18 includes two cylindrical portions of different diameters inter-connected by a wall 19, and its larger diameter cylindrical portion 20 has a press fit with the outer cylindrical surface of cup 10. Extending radially inwardly from its smaller cylindrical portion 21 shell 18 includes a wall portion 22 that lies in a plane perpendicular to the axis about which the bearing 12 rotates. Shell 18 is pressed upon the outer cup 10 so that the wall 19 abuts the adjacent side of cup 10, thereby assuring that wall 22 lies in said perpendicular plane.

A seal disc or ring 23 is held against the inside of wall 22 by a retainer ring 24 having a press fit with the cylindrical wall 21 of shell 18. The inner peripheral edge of seal disc or ring 23 bears upon and has a wiping sealing contact with a cylindrical portion or surface of cone 11 and it cooperates therewith to prevent the escape of lubricant from chamber 17 and the entry of foreign matter thereinto.

Seal disc or ring 23 is preferably made by coating airplane cloth with synthetic rubber on both sides. It is preferable that the thickness of this seal disc or ring be of the order of .025-.030 inch.

Such a seal disc is impervious to water, grease, gasoline, or the like and is resistant to deterioration by them. This is important, of course, because the chamber 17 is normally filled with lubricant such as grease. Such disc is also quite flexible both because of the material of which it is made and because of its thickness and this flexibility is relatively free from fatigue and is maintained over a very wide range of temperatures. This is important because seals are subject to considerable temperature variations, and this seal material is relatively free from permanent set and drift and its life at high, low or changing temperatures is very long. It does not age fast and it does not deteriorate rapidly either under fresh or salt water or in the presence of acids or alkalis.

One such material is sold under the tradename "Fairprene" which is manufactured and sold by the Du Pont Company, the particular quality preferably employed being designated by the number 5007. Obviously, equivalent material of other manufacturers may be used with equal facility.

The sealing device 15 is essentially like sealing device 16, above described, except that it is pressed into the small diameter end of cup 10 and its outer shell 25 is rolled or otherwise expanded to lock it to said cup 10, and its seal disc or ring 26 has a wiping contact with a face 27 of cone 11 that lies in a plane perpendicular to the axis of rotation of the bearing. It will be seen, of course, that, if desired, the cone may be provided with a cylindrical or other shaped surface with which seal disc or ring 26 may cooperate to seal effectively the chamber 17.

In the assembly of the unit shown in the drawings the seal device 15 is first connected or attached to cup 10. The bearing 12 and cone 11 which because of the shape of cone 11 form a sub-assembly, after having been packed with sufficient lubricant, is placed in the cup 10, and the sealing device 16 is then pressed onto cup 10 to close completely the bearing assembly and form it into a unit that cannot, except by the use of force, be disassembled. The unit may be termed as being a greased or sealed-for-life unit and it may be properly called a "package unit," that is, one in which parts are assembled and will not become separated or lost in handling in stock rooms or in shipment and the like.

It is to be noted, however, that lubricant may be added to the chamber 17 by slipping a hypodermic needle or the like between one of the seal discs or rings 23 or 26 and cone 11 and feeding grease to chamber 17.

It is of importance to note that the seal 16 not only functions as a seal, but that it holds the bearing together as a unit during handling and storage of the bearing unit, by cooperating with the large diameter end of the retainer or cage 14 to hold the bearing assembly in the cup, and in the particular bearing illustrated the rolls 13 of bearing assembly 12, because they operate in a recessed race in cone 11, retain the cone in proper relation in the assembly. It is to be understood, of course, that in a broader aspect this invention is not to be limited to roller bearings including recessed cones such as the one described, and also that it is not to be limited to having its grease sealing devices 15 and 16 pressed onto the cup 10. Sealing devices may be secured to either the cup or the cone of the bearing in any suitable manner.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A roller bearing assembly including means forming tapered outer and inner races, bearing rolls between said races, retainer means spacing said rolls apart, and lubricant seal means at each side of said rolls for preventing loss of lubricant from said bearing assembly and the entry of foreign matter thereinto, said seal means at the large diameter end of said races cooperating with said retainer means for holding said elements together as a unit.

2. A roller bearing assembly including means forming tapered outer and inner races, bearing rolls between said races, retainer means spacing said rolls apart, and lubricant seal means at one side of said rolls for preventing loss of lubricant from said bearing assembly and the entry of foreign matter thereinto, said seal means being at the large diameter end of said races and cooperating with said retainer means for holding said elements together as a unit.

3. A roller bearing assembly including means forming a tapered race, bearing rolls associated with said race, retainer means holding and spacing said rolls apart, and lubricant seal means at the large diameter end of said race cooperating with said retainer means for holding said bearing rolls and race together as an assembly.

References Cited in the file of this patent

UNITED STATES PATENTS

| Number | Name | Date |
| --- | --- | --- |
| 2,235,351 | Baker | Mar. 18, 1941 |
| 2,565,070 | Foley | Aug. 21, 1951 |
| 2,584,227 | Potter | Feb. 5, 1952 |
| 2,590,422 | Large | Mar. 25, 1952 |